United States Patent [19]

Salvy et al.

[11] 4,308,003

[45] Dec. 29, 1981

[54] DEVICE FOR ADJUSTING THE INDUCTANCE OF A COIL

[75] Inventors: Raymond Salvy, Rueil-Malmaison; Guy Brugerie, Villejuif, both of France

[73] Assignee: U.S. Philips Corporation, New York, N.Y.

[21] Appl. No.: 146,552

[22] Filed: May 5, 1980

[30] Foreign Application Priority Data

May 23, 1979 [FR] France ............................... 79 13135

[51] Int. Cl.[3] ............................................... B29F 1/03

[52] U.S. Cl. ..................................... 425/110; 425/147

[58] Field of Search ................ 425/145, 147, 148, 110

[56] References Cited

U.S. PATENT DOCUMENTS 3,632,244 1/1972 Sturgeon ......................... 425/145 X

*Primary Examiner*—Thomas P. Pavelko

*Attorney, Agent, or Firm*—William J. Streeter; Bernard Franzblau

[57] ABSTRACT

A device for automatic adjustment of the inductance of a coil by utilizing a magnetic core which is formed by means of a magnetic paste. The device defines the quantity of magnetic paste in dependence on an inductance value measured by means of an inductance measuring apparatus.

8 Claims, 1 Drawing Figure

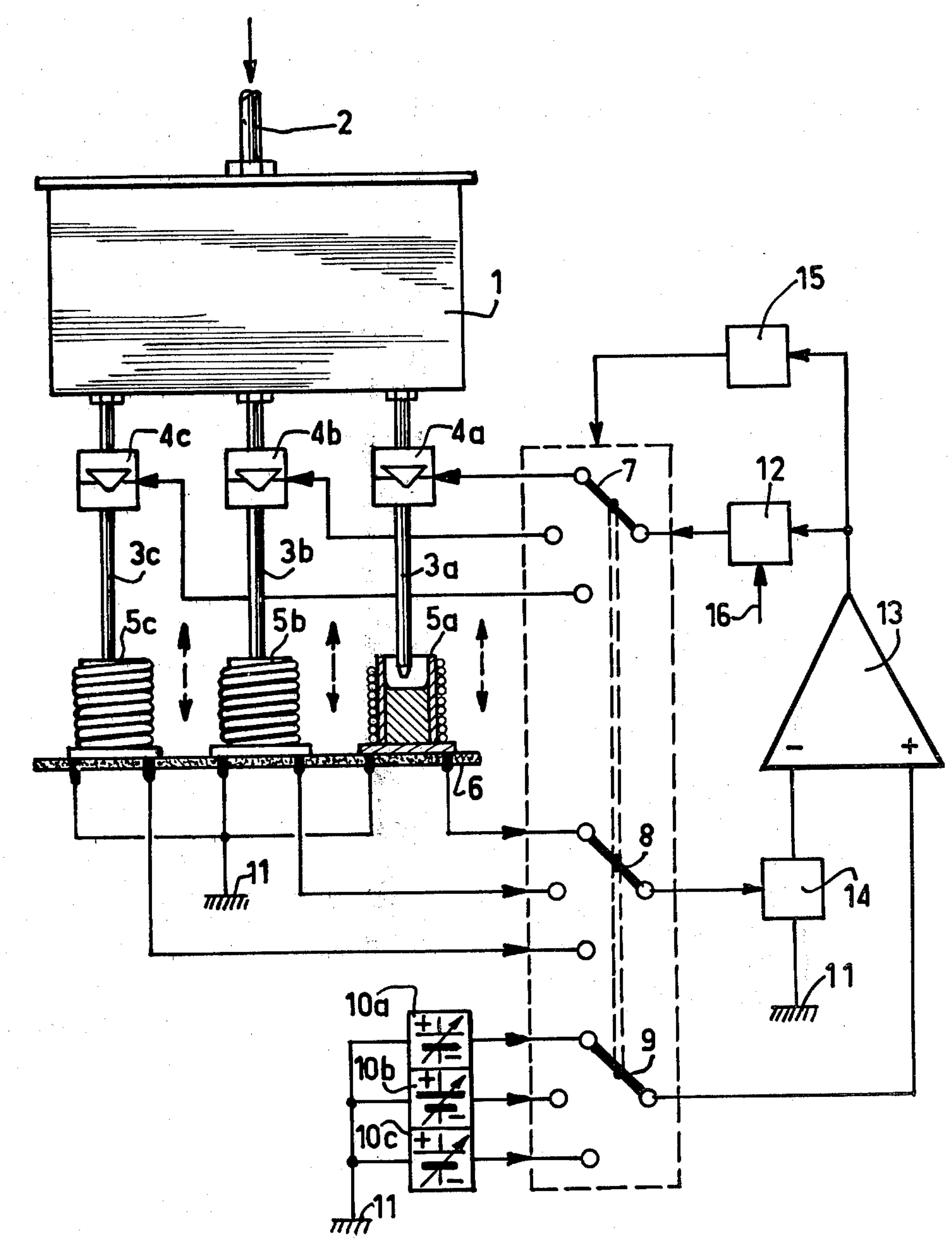
2
1
15
4c
4b
4a
7
12
3c
3b
3a
16
13
5c
5b
5a
6
8
11
14
11
10a
9
10b
10c
11

DEVICE FOR ADJUSTING THE INDUCTANCE OF A COIL

The invention relates to a device for adjusting the inductance of a coil comprising a core which consists of a mixture of a soft magnetic material and a binder material.

The inductance is customarily adjusted by displacement of the threaded core within the former on which the coil is wound. This method is time consuming and hence expensive, while the adjustment thus obtained does not preclude undesired changing of the inductance at a later stage, in spite of the means used for arresting the core in its ultimate position. Moreover, automation of the adjustment by the turning of the core in the unit formed by the coils on a printed circuit board is difficult due to the complexity of the mechanical means to be used.

It is one of the objects of the invention to enable easy adjustment of the inductance of the coils and to reduce the cost price of these coils.

It is a further object of the invention to enable automation of the adjustment, either for each coil separately or for the assembly of a group of coils arranged on a printed wiring board.

To this end, the device in accordance with the invention is characterized in that it comprises a nozzle for injecting a magnetic paste, said nozzle comprising an electric valve with a control winding which is coupled, via a control circuit, to the output of a comparison circuit which comprises two inputs, a first input thereof being connected to the output of an inductance measuring apparatus which is connected to the connections of the coil to be adjusted, while its second input is connected to a reference voltage source.

The device in accordance with the invention automatically interrupts the injection of magnetic paste into the winding mandrel as soon as the desired inductance of the coil is reached.

The adjustment of the inductances of a plurality of coils mounted on a printed wiring board can be simultaneously performed, if desired, by using a corresponding number of inductance measuring apparatus and a corresponding number of comparison circuits.

After the curing of the magnetic paste, any undesirable detuning of the coil at a later stage is precluded.

The invention will be described in detail hereinafter with reference to the accompanying diagrammatic drawing which illustrates an embodiment of the device in accordance with the invention for the consecutive adjustment of the inductances of three coils mounted on a printed wiring board of a television receiver.

In a reservoir 1 containing magnetic paste a given pressure is sustained via an inlet 2 for compressed air. The lower part of the reservoir 1 comprises three paste injection nozzles 3*a*, 3*b* and 3*c*, provided with electric valves 4*a*, 4*b* and 4*c*. Underneath these nozzles there are arranged three coils 5*a*, 5*b* and 5*c*, the first one of which (5*a*) is shown in a longitudinal sectional view. These coils are mounted on a printed wiring board 6.

There are also provided three mutually coupled selector switches 7, 8 and 9. Each of the selection contacts of the first selector switch 7 is connected to one of the electric valves 4*a*, 4*b*, 4*c*, each of the selection contacts of the second switch 8 being connected to a connection of one of the coils 5*a*, 5*b*, 5*c*, and each of the selection contacts of the third switch 8 being connected to a terminal of one of the reference voltage sources 10*a*, 10*b* and 10*c*. The other connections of the coils 5*a*, 5*b* and 5*c* and the other terminals of the voltage sources 10*a*, 10*b* and 10*c* are connected to a common ground terminal 11.

The master contact of the first switch 7 is connected, via a control circuit 12, to the output of a comparison circuit 13, one input of which is connected to the output of an inductance measuring apparatus 14, the input of which is connected to the master contact of the second switch 8. The other input of the comparison circuit 13 is connected to the master contact of the third switch 9. The output of the comparison circuit 13 is also connected, via a second control circuit 15, to a common control input of the switches 7, 8 and 9. The control circuit 12 comprises a lock control input 16. The inductance measuring apparatus 14 supplies the first input of the comparison circuit 13 with a direct voltage which is proportional to the inductance of the coil connected to the input of the apparatus 14, in this case the coil 5*a*. As long as this voltage is lower than the reference voltage supplied by the source 10*a*, the output of the comparator 13 is in a state which keeps the electric valve 4*a* opened via the control circuit 12. The magnetic paste then flows into the winding mandrel of the coil 5*a*, the inductance thereof thus being increased.

At the instant at which the voltage supplied by the apparatus 14 becomes equal to the voltage of the source 10*a*, the state of the output of the comparison circuit 13 changes so that the valve 4*a* is closed and the ejection of paste is interrupted. The inductance can be adjusted by changing the value of the voltage of the source 10*a*.

The change of state of the output of the comparison circuit 13 controls, via the second control circuit 15, the change over of the switches 7, 8 and 9 to their second position in which the described process is repeated, the ultimate inductance of the coil 5*b* then being determined by the value of the voltage of the voltage source 10*b*. Subsequently, the inductance of the coil 5*c* is adjusted by way of the source 10*c*. After that, the adjusted board is replaced by another board and the switches 7, 8 and 9 return to their first position.

The input 16 of the control circuit 12 serves to keep the electric valve connected to the switch 7 closed during the replacement of the boards. These valves are of the normally closed electromagnetic type, which means that the opening of the valves is controlled by the application of a voltage. It is alternatively possible to use normally open electric valves, that is to say valves which are closed by the application of a voltage. A valve of this kind can be realized by surrounding the injection nozzles 3*a*, 3*b* and 3*c* with a coil in which the passage of current interrupts the supply of paste by the formation of a magnetic plug.

It will be clear that the use of this type of valve implies that the inactive valves 3*b* and 3*c* are kept closed by the application of a voltage via a fourth switch (not shown).

If the end of the injection nozzle is situated very near to the coil, the quantity of paste present in the nozzle itself increases the apparent inductance of the coil, but this can be readily taken into account by suitable adaptation of the reference voltages of the sources 10*a*, 10*b* and 10*c* because the geometrical positions of the coils with respect to the nozzles are substantially the same for different boards.

What is claimed is:

1. A device for adjusting the inductance of a coil having a core which includes a mixture of a soft magnetic material and a binder material, said device comprising, a control circuit, a comparison circuit having two inputs and an output, a nozzle for injecting a magnetic paste, said nozzle comprising an electric valve with a control winding coupled via the control circuit to the output of the comparision circuit, means connecting a first input of the comparison circuit to the output of an inductance measuring apparatus which is connected to the connections of the coil to be adjusted, and means connecting the second input of the comparison circuit to a reference voltage source.

2. A device as claimed in claim 1 further comprising three mutually coupled selector switches each having a master contact and n selection contacts, means connecting the master contact of a first selector switch to the output of the control circuit and each of the selection contacts of the first selector switch to a respective valve of a group of n electric valves, means connecting the master contact of a second selector switch to the input of the inductance measuring apparatus and each of the selection contacts of the second selector switch to a connection of a respective coil of a group of n coils, and means connecting the master contact of a third selector switch to the second input of the comparison circuit and each of the selection contacts of the third selector switch to a terminal of a respective reference voltage source of a group of n reference voltage sources.

3. A device as claimed in claim 2 further comprising means connecting the output of the comparison circuit to a control input of the three switches via a second control circuit.

4. A device as claimed in the claims 1, 2 or 3, characterized in that the control circuit of the electric valve comprises a lock control input.

5. A device for adjusting the inductance of a coil having a magnetic core comprising, means for injecting a magnetic material into the core of said coil, said injecting means having a control input for controlling the flow of said magnetic material, a comparison circuit having first and second inputs and an output, a source of reference voltage that determines the inductance value of said coil, an inductance measuring device having an input connected to said coil and an output connected to the first input of the comparison circuit, a control circuit, means coupling the output of the reference voltage source to the second input of the comparison circuit, and means coupling the output of the comparison circuit to the control input of the injecting means via said control circuit thereby to control the flow of magnetic material to the core of the coil as a function of the measured inductance of the coil.

6. A device as claimed in claim 5 adapted to adjust the inductance of a plurality of n coils wherein said injecting means includes n control inputs, said device further comprising, switching means including first means for selectively coupling the control circuit to respective ones of said n control inputs of the injecting means, and second means for selectively connecting the input of the inductance measuring device to respective ones of said n coils.

7. A device as claimed in claim 5 adapted to adjust the inductance of a plurality of n coils by means of n reference voltage sources and which further comprises, switching means including first means for selectively coupling the control circuit to respective control inputs of the injecting means for the n coils, second means for selectively connecting the input of the inductance measuring device to respective ones of said n coils, and third means for selectively coupling the outputs of the n reference voltage sources to said second input of the comparison circuit.

8. A device as claimed in claim 7 further comprising a second control circuit for coupling the output of the comparison circuit to a control input of the switching means thereby to control the operation of the switching means in dependence upon the output of the comparison circuit.

* * * * *